US 11,261,115 B2

(12) United States Patent
Wang et al.

(10) Patent No.: US 11,261,115 B2
(45) Date of Patent: Mar. 1, 2022

(54) METHOD AND DEVICE FOR CONTROLLING POLLUTANTS IN BASIN WATER RESOURCES CYCLING UTILIZATION IN AGRICULTURAL ACTIVITY AREAS

(71) Applicant: CHINESE RESEARCH ACADEMY OF ENVIRONMENTAL SCIENCES, Beijing (CN)

(72) Inventors: Lei Wang, Beijing (CN); Beidou Xi, Beijing (CN); Jinsheng Wang, Beijing (CN); Wenbing Tan, Beijing (CN); Tongtong Li, Beijing (CN); Yangyang Wang, Beijing (CN); Hui Liu, Beijing (CN); Yali Zhang, Beijing (CN); Feng Wu, Beijing (CN); Qian Zhang, Beijing (CN)

(73) Assignee: CHINESE RESEARCH ACADEMY OF ENVIRONMENTAL SCIENCES, Beijing (CN)

( * ) Notice: Subject to any disclaimer, the term of this patent is extended or adjusted under 35 U.S.C. 154(b) by 54 days.

(21) Appl. No.: 16/770,800

(22) PCT Filed: Dec. 12, 2018

(86) PCT No.: PCT/CN2018/120543
§ 371 (c)(1),
(2) Date: Jun. 8, 2020

(87) PCT Pub. No.: WO2019/114745
PCT Pub. Date: Jun. 20, 2019

(65) Prior Publication Data
US 2021/0179465 A1     Jun. 17, 2021

(30) Foreign Application Priority Data
Dec. 13, 2017  (CN) .......................... 201711330923.3

(51) Int. Cl.
    *C02F 9/00*     (2006.01)
    *C02F 1/28*     (2006.01)
    (Continued)

(52) U.S. Cl.
    CPC ................ *C02F 9/00* (2013.01); *C02F 1/281* (2013.01); *C02F 1/283* (2013.01); *C02F 1/32* (2013.01);
    (Continued)

(58) Field of Classification Search
    CPC ....................................................... C02F 9/00
    See application file for complete search history.

(56) References Cited

U.S. PATENT DOCUMENTS

2020/0079700 A1*  3/2020  Shearer ................... C05F 11/04
2020/0223731 A1*  7/2020  Phasey .................... C02F 3/308

FOREIGN PATENT DOCUMENTS

| CN | 205011567 U | * | 2/2016 |
| CN | 105967328 A | * | 9/2016 |
| CN | 106336091 A | * | 1/2017 |

OTHER PUBLICATIONS

Gupta, Use of biochar to enhance constructed wetland performance in wastewater reclamation, Environ. Eng. Res. 2016; 21(1): 36-44 (Year: 2016).*

* cited by examiner

*Primary Examiner* — Chester T Barry
(74) *Attorney, Agent, or Firm* — CBM Patent Consulting, LLC

(57) ABSTRACT

The present invention relates to a method and a device for controlling pollutants in basin water resources cycling utilization in agricultural activity areas. The method includes: providing an acidification tank, an aeration tank and a multi-media constructed wetland connected in sequence, which are 4~10 m far from basin revetment, feeding basin (Continued)

water into the constructed wetland, adsorbing or degrading heavy metals and organic pollutants by the constructed wetland, and then transporting the treated basin water to the agricultural activity areas. The present invention effectively controls the content of heavy metals that will enter the agricultural activity areas, fundamentally reduces the content of heavy metals in the crops, promotes the growth of the crops, maintains sustainable and healthy development of agriculture, and therefore guarantees human health and safety.

9 Claims, 1 Drawing Sheet

(51) Int. Cl.
    *C02F 1/32*     (2006.01)
    *C02F 1/72*     (2006.01)
    *C02F 3/12*     (2006.01)
    *C02F 3/28*     (2006.01)
    *C02F 3/30*     (2006.01)
    *C02F 3/32*     (2006.01)
    *C02F 3/34*     (2006.01)
    *C02F 101/20*     (2006.01)
    *C02F 101/30*     (2006.01)
    *C02F 103/00*     (2006.01)

(52) U.S. Cl.
    CPC ............ *C02F 1/725* (2013.01); *C02F 3/1284* (2013.01); *C02F 3/2813* (2013.01); *C02F 3/308* (2013.01); *C02F 3/322* (2013.01); *C02F 3/327* (2013.01); *C02F 3/34* (2013.01); *C02F 2101/20* (2013.01); *C02F 2101/30* (2013.01); *C02F 2103/007* (2013.01); *C02F 2305/023* (2013.01); *C02F 2305/06* (2013.01); *C02F 2305/10* (2013.01)

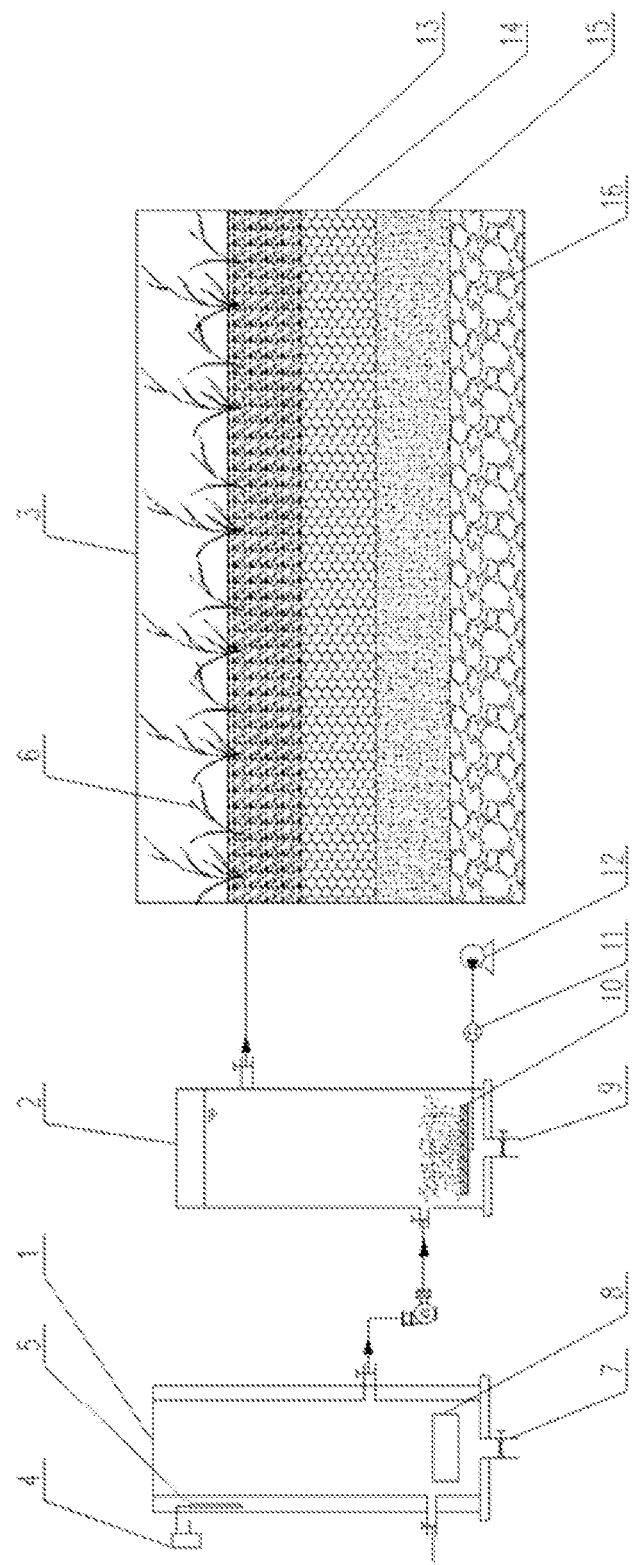

METHOD AND DEVICE FOR CONTROLLING POLLUTANTS IN BASIN WATER RESOURCES CYCLING UTILIZATION IN AGRICULTURAL ACTIVITY AREAS

TECHNICAL FIELD

The invention belongs to the field of pollutant control in water resources cycling utilization, and particularly relates to a method and a device for controlling pollutants in basin water resources cycling utilization in agricultural activity areas.

BACKGROUND ART

The basin is the microcosm of the earth system and the basic unit of the natural water cycle. As far as the hydrological cycle is concerned, the basin is a water cycle unit composed of a self-organized water production interval and a water collection channel. Ecologically, the basin constitutes the basic spatial ecological unit for the operation of the earth's terrestrial ecosystems. From a socio-economic perspective, economic development using the basin as a unit is not only the development model of human ancient civilization, but also one of the main modes of contemporary economic development.

In recent years, water pollution exists in many rivers in China, and the pollution in some river basins is shocking. Water pollution not only caused the deterioration of the health of the basin ecosystem, and disappearance of the aquatic species in the basin, but also seriously affected human health and caused widespread public concern. With rapid progress of China's urbanization and industrialization, the need to treat large amount of sewage will be more urgent.

The heavy metal pollution of farmland soil in China is serious, and about one fifth of the cultivated land is polluted by heavy metals. Because heavy metals in soil are difficult to degrade, are easy to accumulate and are highly toxic, not only will they seriously affect the growth of crops, but also they may enter the human body along the food chain, thereby harming human health. Thus, it is of great practical significance to study heavy metal remediation technologies in farmland soil.

The drought and water shortage are serious in agricultural activity areas in some regions of China, such as the Northwest Region. In order to ensure the normal growth of crops and increase food production, the best measure is to develop irrigated agriculture. Generally, the basin water resources are recycled, that is, basin water is fed in the agricultural activity areas, and then water from the agricultural activity areas flows back into the basin. However, before the basin water resources are recycled, the impact of pollutants on crops needs to be investigated. Usually nutrients with appropriate content of nitrogen and phosphorus can be used to promote plant growth, but too much nitrogen and phosphorus will cause farmland compaction. And due to the severe toxic effects, heavy metals need to be more strictly controlled to avoid their accumulation in human body to a degree to affect human health and safety.

Based on the above, it is necessary to develop a low-cost and effective method and device for controlling pollutants in basin water resources cycling utilization in agricultural activity areas, and the development of the method and the device should comprehensively consider basin water used for irrigation. The method and the device can prevent and control the content of pollutants in basin water that will enter the agricultural activity areas, such as heavy metals, nitrogen and phosphorus, organic matters with long carbon chains, and suspended matters, fundamentally reduce the accumulation of heavy metals in crops, maintain good state of the farmland, promote crop growth, and maintain sustainable and healthy development of agriculture, and thus protect human health and safety.

Contents of the Invention

In order to solve the above problems, the present inventors have conducted intensive studies, and provide a method and a device for controlling pollutants in basin water resources cycling utilization in agricultural activity areas to physically remove or biodegrade heavy metals, nitrogen, phosphorus, organic matters and suspended matters in basin water, so as to ensure the safety of irrigation water, thereby completing the present invention.

The object of the present invention is to provide the following technical solutions:

(1) A method for controlling pollutants in basin water resources cycling utilization in agricultural activity areas, wherein, the method includes: providing a constructed wetland at a set distance from basin revetment, feeding basin water into the constructed wetland, and then adsorbing and degrading the pollutants through the synergistic physical, chemical and biological effects among plants, microorganisms and solid substrates in the constructed wetland, thereafter transporting the treated basin water into the agricultural activity areas;

preferably, the constructed wetland is provided with four layers of fillers from top to bottom:

the first layer of filler is a mixed filler of soil and functional biochar, which adsorbs heavy metals and degrades organic matters;

the second layer of filler is a mixed filler of soil, natural zeolite and limestone, which adsorbs and fixes heavy metals;

the third layer of filler is a mixed filler of fly ash molecular sieve, Flory diatomaceous earth and biochar, which adsorbs heavy metals, and preferably phosphorus-accumulating bacteria is added in this area to reduce the total phosphorus content of basin water to be purified;

the fourth layer of filler is a mixed filler of pebbles and biochar, which adsorbs heavy metals, and preferably phosphorus-accumulating bacteria is allowed to perform anaerobic living activities in this area by constructing an anaerobic environment (such as decomposing polyphosphate in the body under anaerobic conditions to maintain living activities).

(2) A device for controlling pollutants in basin water resources cycle utilization in agricultural activity areas, wherein, the device includes an acidification tank 1, an aeration tank 2, and a constructed wetland 3 connected in sequence, which are at a set distance far from basin revetment in the agricultural activity areas, and in the acidification tank 1, duckweed and algae salvaged from the basin are crushed, acidified and digested, and then the supernatant is transported into the aeration tank 2, and in the aeration tank 2, the supernatant from the acidification tank 1 is received, and organic matters in the supernatant are degraded, thereafter the degraded supernatant is fed into the constructed wetland 3 to provide microorganisms with carbon source, and the constructed wetland 3 is a purification tank with a set depth, in which the supernatant from the aeration tank 2 is mixed with basin water, and then is fed into one or more layers of fillers laid in the constructed wetland 3, where pollutions in basin water are degraded and removed.

According to the present invention, the method and the device for controlling pollutants in basin water resources cycling utilization in agricultural activity areas have the following beneficial effects:

(1) The constructed wetland in the present invention is constructed by laying multiple layers of fillers, and the types of fillers, dosage ratio, particle size and filling height of the filler in each layer are specifically selected, so that heavy metal adsorption, dephosphorization and denitrification can be effectively realized in the constructed wetland.

(2) In the present invention, specific aquatic plants are planted in the constructed wetland, which is beneficial to the enrichment of heavy metals, and the obtained aquatic plants enriched with heavy metals can be reused to prepare functional biochar with photocatalytic effect.

(3) In the present invention, an acidification tank and an aeration tank are built to provide nutrients (mainly a carbon source) to the microorganisms in the constructed wetland, promote the reproduction of microorganisms, and facilitate the dephosphorization and denitrification of the microorganisms in the constructed wetland.

(4) In the present invention, the denitrifying bacteria are inoculated in the river channel. Basin water to be treated will inevitably be further purified by the addition of denitrifying bacteria, especially aerobic denitrifying bacteria. Meanwhile, the synergistic effects of aerobic denitrifying bacteria and anaerobic denitrifying bacteria added in the constructed wetland will promote the water purification.

DESCRIPTION OF FIGURES

FIG. 1 shows a schematic diagram of a device for controlling pollutants in basin water resources cycling utilization in agricultural activity areas according to a preferred embodiment of the present invention.

DESCRIPTION OF THE REFERENCE SIGNS

1—acidification tank;
2—aeration tank;
3—constructed wetland;
4—temperature control device;
5—temperature probe
6—aquatic plant
7—sludge discharge hole
8—agitator
9—secondary sludge discharge hole
10—aeration disk
11—flowmeter
12—nano-aerator
13—first layer of filler
14—second layer of filler
15—third layer of filler
16—fourth layer of filler

SPECIFIC EMBODIMENTS FOR CARRYING OUT THE INVENTION

The present invention will be described in more detail through preferred embodiments and examples. Through these descriptions, the features and advantages of the present invention will become clearer.

The term "exemplary" as used herein is intended to be "serving as an example, an illustrative embodiment, or an embodiment". Any of the embodiments described herein as "exemplary" need not be construed as preferred as or better than other embodiments. Although various aspects of the examples are shown in the figures, unless specifically noted, the figures are not necessarily drawn to scale.

Aiming at the drought and water shortage in the agricultural activity areas in China, a technical route of using basin water for irrigation is proposed. However, the current status of basin water irrigation is to extract untreated water directly from basin water to the agricultural activity areas, or to feed it into the agricultural activity areas after simple filtration to remove obvious impurities. Although these methods have low cost and large water intake, pollutants such as heavy metals, total phosphorus, total nitrogen, or suspended matters cannot be controlled in basin water, which affects the growth and harvest of crops, more seriously will lead to excessive heavy metals in crops, unusable food, soil compaction, thus cause significant losses.

Based on the above, the inventors conducted a lot of research, and provided a method for controlling pollutants in basin water resources cycling (or cycle) utilization in agricultural activity areas. The method can effectively control the content of pollutants, such as heavy metals in basin water fed into agricultural activity areas. As shown in FIG. 1, the method includes providing a multi-media constructed wetland 4~10 m far from basin revetment, feeding basin water into the constructed wetland, and then removing and degrading pollutants by the constructed wetland, thereafter transporting the treated basin water to the agricultural activity areas.

In a preferred embodiment of the present invention, the constructed wetland is used for heavy metal fixation, suspended matter filtration, organic matter degradation, denitrification and dephosphorization. And the constructed wetland is a purification tank with a set depth, in which basin water to be purified is fed, and then is fed into one or more layers of fillers laid in the constructed wetland, where pollutions are degraded and removed.

In a preferred embodiment of the present invention, the constructed wetland is provided with three to six layers of fillers from top to bottom, and the filler of each layer can be selected from one or more of soil, biochar, functional biochar, ore particles such as gravel, natural zeolite, volcanic stone, calcite, limestone, pebbles, and so on, diatomaceous earth or Flory diatomaceous earth.

In a preferred embodiment of the present invention, the constructed wetland is provided with four layers of fillers from top to bottom:

the first layer of filler adsorbs heavy metals and degrades organic matters;

the second layer of filler adsorbs and fixes heavy metals;

the third layer of filler adsorbs heavy metals, and phosphorus-accumulating bacteria is added in this area to reduce the total phosphorus content of basin water to be purified;

the fourth layer of filler adsorbs heavy metals, and phosphorus-accumulating bacteria is allowed to dephosphorize in this area by constructing an anaerobic environment, so its phosphorus-accumulation ability in the third layer of filler is promoted, and anaerobic denitrifying bacteria is added to reduce the nitrogen content of basin water to be purified.

In a preferred embodiment of the present invention, the first layer of filler 13 is laid at 0-500 cm, and the first layer of filler is a mixed filler of soil and functional biochar, and the mixing ratio is 3:(6~8), and preferably 3:7.

Wherein, biochar is a material with high carbon content obtained from biomass after high temperature treating and deoiling under anoxic conditions. Functional biochar is biochar loaded with transition metals.

Functional biochar has the following characteristics of biochar:

(1) In term of microstructure, it has characteristics of porosity, and biochar has a controlled porosity compared to other materials, namely micropores (<0.9 nm), small pores (<2 nm) and large pores (>50 nm). The large pores can ensure the aeration and water retention capacity of soil used with it, and also provide a place for microorganisms to survive and reproduce, thereby improving the activity and reproduction rates of the microorganisms; micropores and small pores affect the adsorption and transfer of molecules by biochar, and the pore structure of biochar can reduce the rate of water penetration and enhance the adsorption capacity of soil for nutrients that are highly mobile and easily leached. Thus, The porous structure is conducive to the growth of plants on the first layer of filler.

(2) The porosity of biochar determines its large surface area, and a large amount of organic matters in the regional water can be adsorbed, which is conducive to the degradation of organic matters after adsorption.

(3) The surface of the biochar has carboxyl, phenolic hydroxyl, and carbonyl oxygen-containing functional groups. The biochar has higher cation exchange capacity because of negative surface charges generated by the above functional groups, and thus can effectively adsorb heavy metal ions in basin water.

It is worth noting that in addition to the above-mentioned characteristics of biochar, the functional biochar is loaded with transition metals (such as nickel, cobalt and iron), therefore water molecules or hydroxides adsorbed on the surface of the functional biochar are oxidized in the presence of oxygen through the photocatalysis of transition metals to generate active oxygen such as hydroxyl radical (.OH), and thus organic pollutants are degraded, desulfurized (S), and dechlorinated (Cl), thereby reducing their toxicity and odor.

In the present invention, the first layer of filler is mainly composed of the functional biochar, and soil is added as an auxiliary, which is beneficial to the planting of the plants on the first layer of filler. After experiments, it is found that when soil and functional biochar were mixed with a weight ratio of at 3:(6~8), good growth of plants could be achieved due to the fixation of the activated carbon to the soil, and a large amount of organic matters can be absorbed by the filler with functional biochar as main part, then be effectively degraded through the photocatalysis of transition metal ions. If the weight ratio of soil to functional biochar is less than 3:8, namely the ratio of soil decreases, plants grow slowly due to lack of necessary nutrients. If the weight ratio of soil to functional biochar is more than 3:6, the photocatalytic effect is reduced, so the degradation efficiency of organic matters decreases.

In a further preferred embodiment, the particle size of the filler in the first layer of filler, especially of the functional biochar, is 0.10-0.30 cm. Within this particle size range, the support of functional biochar to soil is beneficial for air to enter the filler layer, and the plant roots are effectively contacted with air, which is beneficial to the growth of aquatic plants planted on the first layer of filler. The functional biochar located in the lower part of the water body undergoes photocatalytic reaction in the presence of oxygen to achieve effective degradation. If the particle size of the functional biochar is less than 0.10 cm, it is unfavorable for air to enter the filler layer, and is also unfavorable for plant growth and degradation of organic pollutants because of the lack of oxygen. If the particle size of the functional biochar is greater than 0.30 cm, the larger particle size is not beneficial to photocatalytic efficiency due to small surface area.

In a further preferred embodiment, aquatic plants, preferably reeds and campanula, are planted on the first layer of filler. Reeds and campanula can grow normally in eutrophic water bodies, showing good water purification effects, and the values of total nitrogen, total phosphorus and chemical oxygen demand (COD) in water can be effectively reduced by them. Reeds and campanula show extremely high enrichment capacity for heavy metals. Therefore both of the aquatic plants are selected for planting, which is an effective ecological method for reducing heavy metals.

In a further preferred embodiment, functional biochar can be obtained by carbonizing, activating, deoiling, reducing and drying aquatic plants grown in the constructed wetland.

During the growth process of plants, heavy metals are continuously absorbed, and plant biomass that absorbs heavy metals is burned into activated carbon, so heavy metals are embedded in plant carbon fibers as extremely stable connection, rather than bonded to the carbon structure. The load of heavy metals in biochar far exceeds the existing load mode, and biochar has higher electric capacity and photocatalytic ability.

In a preferred embodiment, one of rhamnolipid, aspartic acid or polyaspartic acid or a combination thereof, preferably the combination of rhamnolipid and (poly)aspartic acid, is added during the growth process of aquatic plants, to promote the enrichment of heavy metals in plants, so that the concentration of heavy metals in the plant could be as high as possible. Rhamnolipid and (poly)aspartic acid have good biocompatibility and biodegradability. As water-soluble biosurfactant, rhamnolipid can promote the dissolution of heavy metals adsorbed by soil, etc. through emulsification and solubilization, which is beneficial to plant absorption. (Poly)aspartic acid has the ability to chelate and activate heavy metal ions, thus can dissolve the heavy metals adsorbed by soil, etc., and at the same time it also can effectively promote plant growth, which is different from other chelating agents. By using rhamnolipid and (poly)aspartic acid mixed in a set ratio, heavy metals can be effectively enriched.

Preferably, the concentration of rhamnolipid in basin water to be treated is 1-20 mg/L, and the concentration of (poly)aspartic acid in basin water to be treated is 1-25 mg/L.

In a preferred embodiment of the present invention, the second layer of filler is laid at 500-1000 cm, and the second layer of filler is a mixed filler of soil, natural zeolite and limestone, with the mixing ratio of 1:(2~3):(0.5~1), and preferably 1:2:0.5.

Zeolite is a water-containing porous aluminosilicate with-it's a crystal structure mainly composed of (SiO) tetrahedron. The overall framework of the zeolite molecule is formed by $Al^{3+}$ and $Si^{4+}$ ions and oxygen atoms together, and part of $Si^{4+}$ is replaced by $Al^{3+}$, resulting in excess negative charge. At the same time, there are cavities and channels in the zeolite framework with certain pore size, which determines its adsorption and ion exchange properties. Zeolite adsorbs ammonia nitrogen and adsorbs and fixes heavy metals with greater advantage than other ore raw materials.

Limestone also has more pore structures, so it can effectively adsorb heavy metals. At the same time, the acidity and alkalinity of water can be effectively regulated by limestone, and it play an important role in the growth of plants in the upper filler and the reproduction of microorganisms in water (phosphorus-accumulating bacteria multiply at pH 5~pH 9, and nitrifying bacteria and denitrifying bacteria multiply at pH 6.0~pH 8.5). Meanwhile, limestone can strongly adsorb fluoride ions, which effectively reducing the content of fluorine in water.

The soil also provides support for aquatic plants in the constructed wetland. At the same time, studies have shown that due to the presence of clay minerals, oxides and organic matters in soil, soil has a tendency to enrich heavy metals, which making its ability of adsorption heavy metal ions not to be underestimated.

After a lot of experimental research, the mixing ratio of soil, natural zeolite and limestone in the second layer of filler is 1:(2~3):(0.5~1). Within this range, the adsorption and fixation of most heavy metals and the adjustment of the pH value of water can be realized. If the proportion of soil increases, the adsorption capacity of heavy metals decreases due to the weaker adsorption effect of soil to heavy metals than those of natural zeolite and limestone. On the contrary, nutrient reserves of plant growth may be affected. If the proportion of the natural zeolite increases, the adsorption of heavy metals increases, and correspondingly the amount of soil or limestone decreases, which also has a threat to plant growth or the regulation of the pH value of water. Similarly, the increase of the proportion of limestone is beneficial to the adjustment of the pH value of water, but the effect of other components is reduced accordingly. On the contrary, the pH value of water cannot be adjusted quickly and effectively, thereby affecting the functional activities of microorganisms.

In a further preferred embodiment, the particle size of the filler in the second layer of filler is 0.08-0.1 cm, which is equal to or lower than that of the functional biochar in the first layer of filler, and is equal to or higher than the particle size in the third layer of filler. This particle size range is chosen under considering the coordination of gas circulation and total metal adsorption. When the particle size is less than 0.08 cm, although the adsorption of heavy metals is promoted, it is not beneficial to the phosphorus accumulation of the phosphorus-accumulating bacteria placed in the third layer of filler due to increased packing density and poor air circulation. When the particle size is higher than 0.1 cm, air circulation is promoted, but corresponding heavy metal adsorption capacity is significantly reduced compared to that with particle size of 0.08 cm.

In a preferred embodiment of the present invention, the third layer of filler is laid at 1000-1500 cm, and the third layer of filler is a mixed filler of fly ash molecular sieve, Flory diatomaceous earth and biochar with the mixing ratio of 1:(3~4):(1~1.5), and preferably 1:3:1.

In the present invention, three kinds of porous fillers, namely fly ash molecular sieve, Flory diatomaceous earth and biochar are used to adsorb heavy metals in the deep layer of the constructed wetland. The common feature of these porous fillers is the high porosity, which is convenient for the biofilm formation of microorganisms. Wherein, fly ash is used as a molecular sieve, based on the fact that the main components of fly ash are similar to those of molecular sieves. Fly ash is currently treated as waste, because it contains heavy metal ions, such as Cr, Hg, As and Pb, and will pollute air, water, soil, and so on. If fly ash is used as molecular sieve, its cation exchange characteristics and pore structure are beneficial to achieve the adsorption of heavy metals, thereby the source of pollution is used effectively.

Biochar with large surface area also has excellent heavy metal adsorption capacity.

Compared with ordinary diatomaceous earth, Flory diatomaceous earth has larger pore volume, larger specific surface area, and stronger adsorption of heavy metals and organic pollutants. In particular, Flory diatomaceous earth has a depth effect, that is, in deep filtration, the separation process only occurs in the "inside" of the medium, and some of the relatively small impurity particles that pass through the surface of Flory diatomaceous earth are blocked by the tortuous micropore structure and the finer pores inside diatomaceous earth. When the particles hit the wall of the channel, it is possible to escape from the flow. The nature of Flory diatomaceous earth is beneficial to the long-term retention of bacterial microorganisms in this area, which facilitates the placement of microorganisms.

Since the fly ash molecular sieve, Flory diatomaceous earth and biochar have different adsorption advantages for different heavy metals, the mixing ratio of fly ash molecular sieve, Flory diatomaceous earth and biochar is 1:(3~4):(1~1.5), which is beneficial to the placement of microorganisms, thereby improving the adsorption of various heavy metal ions.

In a preferred embodiment, the particle sizes of fly ash molecular sieve, Flory diatomaceous earth and biochar are 0.05-0.08 cm. Due to the high porosity of above three kinds of fillers, it is beneficial to the adsorption of heavy metal ions and the biofilm formation of microorganisms.

In a preferred embodiment, phosphorus-accumulating bacteria are added in the third layer of filler to reduce the total phosphorus content of basin water to be purified. Said phosphorus-accumulating bacteria are selected from one or more of *Acinetobacter, Aeromonas* and *Pseudomonas*, and preferably *pseudomona alcaligenes*.

Under aerobic conditions, free oxygen is used as the electron acceptor by phosphorus-accumulating bacteria to oxidize β-hydroxy butyric acid (PHB) stored in cells, and the energy generated by this reaction is used to excessively take up phosphate from water to synthesize the high-energy substance adenosine triphosphate (ATP), wherein a part of which is provided for bacterial synthesis and life-sustaining activities, and another part of which is used to synthesize polyphosphate which accumulating in bacterial cells. Under anaerobic conditions, the phosphorus-accumulating bacteria decompose the polyphosphate in the body and produce ATP. Phosphorus is released by the phosphorus-accumulating bacteria under anaerobic conditions. The amount of aerobic phosphorus accumulating is greater than that of the anaerobic phosphorus releasing, thus the phosphorus content of basin water can be effectively controlled by inputting the phosphorus-accumulating bacteria.

In a preferred embodiment of the present invention, the fourth layer of filler is laid at 1500~2000 cm, the fourth layer of filler is a mixed filler of pebbles and biochar with the mixing weight ratio of 1:(1~2), and preferably 1:1. Pebbles also can absorb heavy metals, and are cooperated with biochar to synergistically adsorb heavy metals.

In a further preferred embodiment, the particle size of the filler in the fourth layer of filler is 0.30-0.50 cm. Large gaps will be formed between the fillers due to the particle size, which facilitates the circulation of the introduced microorganisms. Because the particle size of the filler in the third layer of filler is relatively smaller, microorganisms are restricted to enter the fourth layer of filler to a certain extent. If the particle size of the filler in the fourth layer of filler is also reduced, the phosphorus-accumulating bacteria cannot effectively travel to and from the third and fourth layers of filler, which is not beneficial to the process of phosphorus-accumulating and -releasing.

In a further preferred embodiment, the fourth layer of filler is an anoxic or anaerobic environment, and anaerobic denitrifying bacteria, preferably heterotrophic anaerobic denitrifying bacteria, are added to the fourth layer of filler.

$NO_3^-$ can be gradually converted to $NO_2^-$, NO, $N_2O$ and $N_2$ by the denitrifying bacteria, and gets out of the system, thereby achieving the purpose of denitrification. Although certain nitrifying bacteria and denitrifying bacteria are present in basin water, some denitrifying bacteria are added in basin water in present invention to further improve the denitrification efficiency.

In a further preferred embodiment, phosphorus-accumulating bacteria are added to the fourth layer of filler. Phosphorus is released by the phosphorus-accumulating bacteria under anaerobic conditions, and the phosphorus releasing under this condition will promote better phosphorus accumulation under aerobic conditions in the third layer of filler.

In order to achieve and maintain the anaerobic or anaerobic environment in the fourth layer of filler, a polar polymer film, such as polyaniline film, is filled between the third layer of filler and the fourth layer of filler. The polar polyaniline film has unique functions of water permeability and air impermeability. Therefore, water and microorganisms are allowed to circulate between the third layer of filler and the fourth layer of filler, while the upper layer of oxygen-containing gas is prevented from entering the fourth layer of filler, thereby the living activities of anaerobic denitrifying bacteria and phosphorus-accumulating bacteria in this area can be ensured.

Appropriate amount of phosphorus and nitrogen fertilizers are required for the growth of plants. The phosphorus in the phosphorus fertilizer and the nitrogen in the nitrogen fertilizer are absorbed by the plants in the form of acid radical ions. However, only a part of the fertilizer applied to soil each year is absorbed by the crops of the season, and the rest is fixed by soil to form large amount of acidic salt deposits, causing soil compaction. Basin water may be rich in nitrogen and phosphorus, and both exist in the form of organic phosphorus and organic nitrogen, or inorganic phosphorus and inorganic nitrogen. Organic phosphorus and organic nitrogen are decomposed into inorganic phosphorus, inorganic nitrogen and short carbon chains in the constructed wetlands. The formed inorganic phosphorus and inorganic nitrogen mostly exist in water in the form of acid radical ions. Once the contents exceed the plant's requirements, soil condition will definitely be affected, and acidic salt deposition and soil compaction will also occur. Therefore, after extensive research, the aerobic area and the anaerobic area are set up in the constructed wetland, and phosphorus-accumulating bacteria and denitrifying bacteria are add, thereby effectively solving the problem of excessive nitrogen and phosphorus.

The thicknesses of the first layer of filler, the second layer of filler, the third layer of filler and the fourth layer of filler are all 500 cm, and the total thickness of the fillers is 2000 cm; and said thickness is the most preferable to effectively implement the function of each filler layer. The thickness of the first layer of filler is from 100 to 700 cm, the thickness of the second layer of filler is from 300 to 700 cm, the thickness of the third layer of filler is from 200 to 600 cm, and the thickness of the fourth layer of filler is from 100 to 600 cm.

A carbon source is required with the growth of microorganisms, especially short chain carbon source is more beneficial to the absorption and utilization of microorganisms. However, the content of carbon, especially short-chain carbon, in basin water is small, and the growth and reproduction of microorganisms placed in the constructed wetlands are bound to be affected.

Therefore, an acidification tank and an aeration tank are built to provide nutrients to microorganisms in the present invention. Wherein, the acidification tank and the aeration tank are 4~10 m far from basin revetment, and the acidification tank, the aeration tank and the constructed wetland are connected in sequence.

In the present invention, duckweed or algae salvaged from the basin are acidified and digested in the acidification tank, and then the supernatant is transported into the aeration tank to further degrade organic matters with long carbon chains, thereafter water from the aeration tank is mixed with basin water, and is fed into the multi-media constructed wetland.

In a preferred embodiment, the acidification tank is a container with an interlayer. There is a heat transfer medium in the interlayer, so the temperature of the heat transfer medium is measured by the temperature probe of the temperature control device to control the temperature in the acidification tank.

In a preferred embodiment, a sludge discharge hole is set at the bottom of the acidification tank. Because duckweed or algae in basin water is used as the raw material of nutrients for bacterial growth, sludge in basin water is inevitably brought into the acidification tank. The setting of the sludge discharge hole is beneficial to the discharge of sludge and reduces the invalid occupation of the space in the acidification tank.

In a preferred embodiment, the acidification tank is equipped with an agitator, so that duckweed or algae can be crushed to speed up the acidification and digestion process.

In a preferred embodiment, when the COD of the supernatant of the acidification tank is higher than 200 mg/L, it is considered that the decomposition degree in the acidification tank is good, and high level of organic matters has been obtained.

In the present invention, the supernatant from the acidification tank is received by the aeration tank, and organic matters with long carbon chains in the supernatant are degraded into organic matters with short carbon chains, which is convenient for microorganisms in the constructed wetland to obtain a carbon source.

In a preferred embodiment, an aeration disk is set at the lower part of the aeration tank, and an oxygen-containing fluid is introduced through the aeration disk into the aeration tank. Furthermore, the oxygen-containing fluid is nano-bubble water or the aqueous solution containing tiny bubbles with a size of 100~500 nm and the dissolved oxygen amount of 10~25 mg/L.

Due to the small size and the large specific surface area of the bubbles in the nano-bubble water, they can show characteristics different from ordinary bubbles. For example, the residence time of the bubbles in the device is long due to their small volume. When the bubbles slow rise, both the zeta potential and the specific surface area increase (when ordinary bubbles rise, their volume increases and their specific surface area decreases; while the specific surface area of nano-bubbles increases during they rise process, due to a self-pressurizing effect of the internal gas of nano-bubbles because of the surface tension). Active oxygen radicals, such as hydroxyl radicals, are generated after the bubbles collapse, thereby efficiently degrading or mineralizing organic matters with long carbon chains in water; and the high temperature generated at the moment of collapse is also beneficial to the degradation of organic matters with long carbon chains.

In a preferred embodiment, the diameters of the pores on the aeration disk is nano-scale, that is, the aeration disk is a nano-aeration disk, and it can be set to further ensure oxygen entering the aeration tank to be nano-sized bubbles.

In a preferred embodiment, a secondary sludge discharge hole is set at the bottom of the aeration tank to further remove the sludge, algae and duckweed residues brought by basin water, to avoid blocking the pipeline when transporting to the constructed wetland, or to avoid blocking the pore of the aeration disk in the aeration tank.

In a further preferred embodiment, the aeration disk is connected to a flowmeter and a nano-aerator in sequence through a pipeline. The oxygen-containing fluid is supplied through the nano-aerator to the aeration disk, and the amount of oxygen fed into the aeration tank can be effectively controlled by the flowmeter. The amount of fed gas is maintained between 0.5 mg/L and 0.7 mg/L, based on the amount of liquid in the aeration tank. Within this range, organic matters with long carbon chains can be effectively degraded, so that the average molecular weight of organic matters in water from the aeration tank is lower than 308.24 Da, and preferably lower than 254.50 Da. If the amount of fed gas is less than 0.5 mg/L, the degradation efficiency of organic matters with long chain carbons is low, and the average molecular weight of organic matters in water from the aeration tank is generally higher than 308.24 Da, which is not beneficial for microbial absorption and utilization. If the amount of fed gas is higher than 0.7 mg/L, the bubbles increase, and their collision frequency increases. Therefore, lots of the bubbles rupture in the bottom of the aeration tank, and the degradation in the upper part decreases, which also leads to low degradation efficiency.

In a further preferred embodiment, microorganisms are added into the aeration tank, and the microorganism is *Acinetobacter junii*. Organic matters with long carbon chains are used by *Acinetobacter junii* as the carbon source, so the addition of *Acinetobacter junii* can promote the degradation of organic matters with long carbon chains.

Meanwhile, oxygen, nitrite or nitrate are used as electron acceptors by *Acinetobacter junii* (which is a phosphorus-accumulating bacteria) for denitrifying phosphorus uptake. Therefore, after degrading organic matters with long carbon chains in the aeration tank, *Acinetobacter junii* will be fed into the constructed wetland together with the obtained short chain hydrocarbon organic matters, which is beneficial to the dephosphorization and denitrification of basin water in the constructed wetland.

In a preferred embodiment of the present invention, in addition to constructing the acidification tank, the aeration tank and the constructed wetland, basin water in the river is also pre-treated by inoculating denitrifying bacteria, and preferably solid aerobic denitrifying bacteria, such as *Alicaligenes faecalis* or *Thiosphaera pantotropha*.

Preferably, the concentration of denitrifying bacteria in basin water of the river is 5~100 billion/g. It only needs to be inoculated once when basin water is used for irrigation. Basin water to be treated will inevitably be further purified by the addition of denitrifying bacteria, especially aerobic denitrifying bacteria. Meanwhile, the synergistic effect of aerobic denitrifying bacteria and anaerobic denitrifying bacteria added in the constructed wetland will promote the water body purification.

Another object of the present invention is to provide a device for controlling pollutants in basin water resources cycling utilization in agricultural activity areas. The device includes an acidification tank 1, an aeration tank 2, and a constructed wetland 3 connected in sequence, which are 4~10 m far from the basin revetment in the agricultural activity areas.

In the acidification tank 1, duckweed and algae salvaged from the basin are crushed, acidified and digested, and then the supernatant is transported into the aeration tank 2.

In the aeration tank 2, the supernatant from the acidification tank 1 is received, and organic matters with long carbon chains in the supernatant are degraded, thereafter the degraded supernatant is fed into the constructed wetland 3 to provide microorganisms with carbon source.

The constructed wetland 3 is a purification tank with a set depth, in which water from the aeration tank 2 is mixed with basin water, and then is fed into one or more layers of fillers laid in the constructed wetland 3, where pollutions in basin water are degraded and removed through heavy metal fixation, suspended matter filtration, denitrification and dephosphorization, and so on.

In a preferred embodiment, the acidification tank 1 is a container with an interlayer. There is a heat transfer medium in the interlayer, so the temperature of the heat transfer medium is measured by the temperature probe 5 of the temperature control device 4 to control the temperature in the acidification tank 1.

In a preferred embodiment, a sludge discharge hole 7 is set at the bottom of the acidification tank 1. Because duckweed or algae in basin water is used as the raw material of nutrients for bacterial growth, sludge in basin water is inevitably brought into the acidification tank 1. The setting of the sludge discharge hole 7 is beneficial to the discharge of sludge and reduces the invalid occupation of the space in the acidification tank 1.

In a further preferred embodiment, the acidification tank 1 is equipped with an agitator 8, so that duckweed or algae can be crushed to speed up the acidification and digestion process.

In a preferred embodiment, an aeration disk 10 is set at the lower part of the aeration tank 2, and an oxygen-containing fluid is introduced through the aeration disk 10 into the aeration tank 2. Furthermore, the oxygen-containing fluid is nano-bubble water or the aqueous solution containing tiny bubbles with a size of 100~500 nm and the dissolved oxygen amount of 10~25 mg/L.

In a preferred embodiment, the diameters of the pores on the aeration disk 10 is a nano-scale, that is, the aeration disk 10 is a nano-aeration disk, and it can be set to further ensure oxygen entering the aeration tank to be nano-sized bubbles.

In a preferred embodiment, a secondary sludge discharge hole 9 is set at the bottom of the aeration tank to further remove the sludge brought by basin water, to avoid blocking the pipeline when transporting to the constructed wetland, or to avoid blocking the pore of the aeration disk 10 in the aeration tank 2.

In a further preferred embodiment, the aeration disk 10 is connected to a flowmeter 11 and a nano-aerator 12 in sequence through a pipeline. The oxygen-containing fluid is supplied through the nano-aerator 12 to the aeration disk, and the amount of oxygen fed into the aeration tank 2 can be effectively controlled by the flowmeter 11.

In a further preferred embodiment, microorganisms are added into the aeration tank 2, and the microorganism is *Acinetobacter junii*. Organic matters with long carbon chains are used by *Acinetobacter junii* as the carbon source for growth, so the addition of *Acinetobacter junii* can promote the degradation of organic matters with long carbon chains.

In a preferred embodiment of the present invention, the constructed wetland 3 is provided with four layers of fillers from top to bottom:

the first layer of filler 13 adsorbs heavy metals and degrades organic matters;

the second layer of filler 14 adsorbs and fixes heavy metals;

the third layer of filler 15 adsorbs heavy metals, and phosphorus-accumulating bacteria is added in this area to reduce the total phosphorus content of basin water to be purified because of its phosphorus-accumulation ability;

the fourth layer of filler 16 adsorbs heavy metals, and phosphorus-accumulating bacteria is allowed to dephosphorize in this area by constructing an anaerobic environment, so its phosphorus-accumulation ability in the third layer of filler 15 is promoted, and an anaerobic denitrifying bacteria is added to reduce the nitrogen content of basin water to be purified.

Specifically, the first layer of filler 13 is a mixed filler of soil and functional biochar. The mixing ratio is 3:(6~8), and preferably 3:7, the particle size of the filler is 0.10-0.30 cm, and the thickness of the filler is from 100 to 700 cm.

The second layer of filler 14 is a mixed filler of soil, natural zeolite and limestone. The mixing ratio is 1:(2~3):(0.5~1), and preferably 1:2:0.5, the particle size of the filler is 0.08-0.1 cm, and the thickness of the filler is from 300 to 700 cm.

The third layer of filler 15 is a mixed filler of fly ash molecular sieve, Flory diatomaceous earth and biochar. The mixing ratio is 1:(3~4):(1~1.5), and preferably 1:3:1, the particle size of the filler is 0.05-0.08 cm, and the thickness of the filler is from 200 to 600 cm.

The fourth layer of filler 16 is a mixed filler of pebbles and biochar. The mixing ratio is 1:(1~2), and preferably 1:1, the particle size of the filler is 0.30-0.50 cm, and the thickness of the filler is from 100 to 600 cm.

In the present invention, the ratio of different materials in each layer of filler is based on the weight thereof.

In a further preferred embodiment, aquatic plants 6 are planted on the constructed wetland 3, and said aquatic plants are reeds and campanula.

In a preferred embodiment, a polar polymer, such as polyaniline film, is filled between the third layer of filler 15 and the fourth layer of filler 16. Phosphorus-accumulating bacteria is added to the third layer of filler 15, and denitrifying bacteria and phosphorus-accumulating bacteria are added to the fourth layer of filler 16.

In the present invention, aquatic plants such as reeds and campanula, planted in the constructed wetland, has extremely excellent enrichment effect on heavy metals, so can be used to prepare functional biochar.

In a preferred embodiment of the present invention, the preparation of functional biochar includes the following steps:

step 1, crushing the plants and carbonizing to obtain activated carbon;

step 2, activating the activated carbon to obtain activated carbon after activation;

step 3, reducing the activated carbon after activation to obtain functional biochar.

In step 1, the whole plant is crushed to particles with a length of 3-5 mm as needed.

Argon is filled in a heating vessel, such as a tube muffle furnace, to obtain an inert environment. After a temperature of 1200° C. is reached in the heating vessel, in which the crushed plant particles are fed, thereafter 1200° C. is maintained for 120 min, and then the temperature is reduced from 1200° C. to 20° C. within 200 min, thereby carbonizing the biomass.

In step 2, the activated carbon is washed with distilled water until the water is clear after washing. In order to activate, 30-50 wt. % zinc chloride is added to the washed activated carbon until the liquid level is higher than the activated carbon, and the mixture is stirred, microwave radiated for a set time, and then soaked at 25° C. overnight. The activated carbon after activation is washed to neutral, dried and ready for use.

Bio-oil produced by carbonization in step 1 is detached from the internal pores of the activated carbon through the activation, thereby preventing bio-oil from clogging the internal pores of the activated carbon, and the decrease of the adsorption and photocatalytic effects.

During the activation, a microwave of 300 W-700 W is used to radiate for 20~30 min.

In step 3, the activated carbon after activation is dried, and a solution of sodium borohydride is added dropwise at a low temperature to reduce the metal ions in the activated carbon, for example, ferrous ions is reduced to iron at zero valence. Preferably, the activation reaction is promoted by shaking at 120 rpm with a shaker. The concentration of sodium borohydride solution is 10 mmol/L~30 mmol/L.

The activated carbon is washed with distilled water and dried. After cooling to room temperature, the activated carbon after reduction is filled into a container, sealed, and heated at 180~680° C. in an oven for 10~60 minutes, and then cooled to room temperature to give functional biochar (that is, in situ self-reduction supported activated carbon).

During the growth process of plants, heavy metals are continuously absorbed, and plant biomass that absorbs heavy metals is burned into activated carbon, so heavy metals are embedded in plant carbon fibers as extremely stable connection, rather than bonded to the carbon structure. The load of heavy metals in biochar far exceeds the existing load mode. After the biochar is activated, the ash tar on its surface is removed, and the metal ions are exposed and then are reduced by sodium borohydride, thereby obtaining activated carbon loaded with heavy metals, which not only has inherent performances of activated carbon, such as regulating urban hydraulics, increasing soil fertility, maintaining nutrient and improving microbial habitat, but also has the functions of electric capacity and catalysis.

EXAMPLE

Example 1: The Method for Controlling Pollutants in Basin Water Resources Cycling Utilization As shown in FIG. 1, provide an acidification tank, an aeration tank and a multi-media constructed wetland connected in sequence. The duckweed and algae salvaged in basin water are crushed, acidified and digested in the acidification tank, then the supernatant from the acidification tank is transported into the aeration tank, and the amount of dissolved oxygen in the aeration tank is maintained at 4-6 mg/L. Water from the aeration tank is mixed with basin water, and then is fed into the multi-media constructed wetland.

There are four layers of fillers in the multi-media constructed wetland: the first layer of filler at 0-500 cm is a mixed filler of soil and functional biochar, wherein the mixing ratio is 3:7, and the particle size of the filler is 0.10-0.30 cm, and the aquatic plant, reeds, is planted on it; the second layer of filler at 500-1000 cm is a mixed filler of soil, natural zeolite and limestone, wherein the mixing ratio is 1:2:0.5 and the particle size of the filler is 0.08-0.1 cm; the third layer of filler at 1000-1500 cm is added phosphorus-accumulating bacteria *pseudomona alcaligenes*, and the third layer of filleris a mixed filler of fly ash molecular sieve (Henan Mingze Environmental Protection Technology Co., Ltd., 13× molecular sieve), Flory diatomaceous earth and biochar, wherein the mixing ratio is 1:3:1 and the particle size of the filler is 0.05-0.08 cm; the fourth layer of filler at 1500-2000 cm is added anaerobic denitrifying bacteria and phosphorus-accumulating bacteria *pseudomona alcaligenes*, and the fourth layer of filler is a mixed filler of pebbles and biochar, wherein the mixing ratio is 1:1 and the particle size of the filler is 0.30-0.50 cm. Between the third and the fourth layers of filler is filled a polar polymer polyaniline film (obtained according to "Wang Hui. Electrochemical synthesis of polyaniline film photoelectric properties [J]. Journal of Xi'an Jiaotong University, 1999, (08): 107-108")

Example 2~18

Implementing the method for controlling pollutants in basin water resources cycling utilization in agricultural activity areas through the acidification tank, aeration tank and the multi-media constructed wetland, in the same manner as in Example 1, with the differences are shown in Table 1 below.

TABLE 1

| Example number | Differences fromExample 1 (the substance and order related to the ratio is the same as those in Example 1) |
|---|---|
| Example 2 | The filler in first layer is soil |
| Example 3 | The mixing ratio in the first layer of filler is 1:1 |
| Example 4 | The particle size of the filler in first layer is 0.01-0.08 cm |
| Example 5 | The particle size of the filler in first layer is 5-30 mm |
| Example 6 | The second layer of filler is soil and limestone in original proportion |
| Example 7 | The second layer of filler is soil and natural zeolite in original proportion |
| Example 8 | The mixing ratio in the second layer of filler is 1:1:2 |
| Example 9 | The particle size of the filler in second layer is 0.01-0.05 cm |
| Example 10 | The particle size of the filler in second layer is 1-10 mm |
| Example 11 | The third layer of filler is fly ash molecular sieve and biochar in original proportion |
| Example 12 | The third layer of filler is fly ash molecular sieve and Flory diatomaceous earth in original proportion |
| Example 13 | The mixing ratio in the third layer of filler is 1:1:1 |
| Example 14 | The particle size of the filler in third layer is 0.005-0.03 cm |
| Example 15 | The filler of fourth layer is pebbles |
| Example 16 | The particle size of the filler in fourth layer is 0.001-0.30 cm |
| Example 17 | No phosphorus-accumulating bacteria is fed in the third and the fourth layers of filler |
| Example 18 | No anaerobic denitrifying bacteria is fed in the fourth layer of filler |

EXPERIMENTAL EXAMPLE

The effects of the pollutant control methods in Examples 1~18 are evaluated by measuring the content of heavy metals, $COD_{Cr}$, total phosphorus, total nitrogen and pH in the water before and after the treatment. The results are shown in Table 2.

The water used for evaluation is collected from river water. $SnCl_4$, $Zn(NO_3)_2$, biogas slurry, $Na_3PO_4$ and $NaNO_3$ are added to water, so that the concentration of Sn in water is 5.23 mg/L, the concentration of Zn is 6.88 mg/L, and the total content of P is 3.36 mg/L, the total content of N is 4.57 mg/L, the concentration of $COD_{Cr}$ is 124 mg/L, and the pH value is 7.28. The treated water is fed directly into the constructed wetland with the inflowing rate of 2.5 L/min, and the outflowing rate is 2.5 L/min. The treatment time is 12 h, and the water quality is measured after 12 h.

TABLE 2

| Example number | Sn (mg/L) | Zn (mg/L) | $COD_{Cr}$ (mg/L) | Total P (mg/L) | Total N (mg/L) | pH |
|---|---|---|---|---|---|---|
| Example1 | 1.20 | 1.81 | 60 | 2.07 | 2.35 | 7.14 |
| Example2 | 1.45 | 2.19 | 148 | 2.46 | 2.54 | 7.11 |
| Example3 | 1.25 | 1.92 | 68 | 2.20 | 2.68 | 7.20 |
| Example4 | 0.95 | 1.74 | 54 | 2.65 | 2.87 | 6.98 |
| Example5 | 1.33 | 1.98 | 89 | 2.15 | 2.50 | 7.06 |
| Example6 | 2.56 | 2.99 | 66 | 2.23 | 2.19 | 7.14 |
| Example7 | 0.78 | 1.50 | 71 | 2.88 | 3.09 | 6.19 |
| Example8 | 1.78 | 2.64 | 64 | 2.19 | 2.44 | 7.25 |
| Example9 | 0.52 | 1.23 | 74 | 2.68 | 2.90 | 7.08 |
| Example10 | 1.29 | 2.12 | 67 | 2.43 | 2.58 | 7.15 |
| Example11 | 1.32 | 1.89 | 69 | 2.73 | 2.80 | 7.14 |
| Example12 | 1.51 | 1.77 | 58 | 2.41 | 2.52 | 7.10 |
| Example13 | 1.40 | 1.93 | 65 | 2.61 | 2.67 | 7.16 |
| Example14 | 1.10 | 1.69 | 57 | 2.32 | 2.40 | 7.20 |
| Example15 | 1.54 | 1.99 | 62 | 2.35 | 2.48 | 7.10 |
| Example16 | 1.47 | 1.82 | 65 | 2.47 | 2.69 | 7.14 |
| Example17 | 1.30 | 1.91 | 80 | 3.28 | 2.87 | 7.31 |
| Example18 | 1.15 | 1.84 | 88 | 2.80 | 3.79 | 7.27 |

As can be seen from Table 2, the decrease in the proportion of functional biochar in the first layer of filler mainly affects the adsorption of heavy metals and the reduction of COD values. When the size of the filler becomes smaller, it is conducive to the adsorption of heavy metals, because it may affect the air entering the water, thereby reducing the ability of microorganisms to dephosphorize and denitrify. When the size of the filler becomes larger, the dephosphorization and the denitrification of microorganisms are promoted, thus the content of phosphorus and nitrogen decreases, but it has certain adverse effect on heavy metal adsorption.

The decrease in the proportion of natural zeolite in the second layer of filler mainly affects the adsorption and fixation of heavy metals, which causing higher content of heavy metals in the treated system. The pH value in the system is affected by the decrease in the proportion of limestone, and the efficiency of dephosphorization and denitrification of microorganisms is reduced, causing higher contents of total nitrogen and total phosphorus in water is higher. The decrease in the particle size of the filler can significantly improve the adsorption of heavy metals, but it is unfavorable for the regulation of COD, total nitrogen and total phosphorus due to the obstruction of gas flow.

In the third layer of filler, Flory diatomaceous earth is conducive to microorganisms and its dephosphorization and denitrification, and thus the effect of dephosphorization and denitrification decreases as the proportion of Flory diatomaceous earth decreases. The removal of biochar with excellent adsorption performance has certain impact on the level of heavy metals. And the adsorption of heavy metals can be significantly improved by decreasing the particle size of filler.

In the fourth layer of filler, the level of heavy metals is slightly increased by replacing activated carbon with pebbles, since activated carbon has better adsorption to heavy metals than pebbles. The adsorption performance can be enhanced by decreasing the particle size of the filler, but close packing is not beneficial to the dephosphorization and the denitrification of microorganisms, therefore, the total phosphorus and total nitrogen levels increase slightly as the particle size of the filler in fourth layer decreases.

Anaerobic denitrifying bacteria and phosphorus-accumulating bacteria have the functions of denitrification and dephosphorization, respectively. For the above reason, the total nitrogen and total phosphorus in the water body are significantly increased when both of them are not added to the water.

In the description of the present invention, it should be noted that the orientation or positional relationship indicated by the terms "over", "under", "inner", "outer", "front" and "rear" is based on the working state of the present invention. and is only for the convenience of describing the present invention and simplifying the description, rather than indicating or implying that the device or element referred to must have a specific orientation, be constructed and operated in a specific orientation, and therefore cannot be construed as limiting the present invention.

The present invention has been described in detail with reference to specific embodiments and exemplary examples, but these descriptions should not be construed as limiting the present invention. Those skilled in the art should understand that, without departing from the spirit and scope of the present invention, various equivalent replacements, modifications, or improvements can be made to the technical solution and its implementation of the present invention, all of which fall within the scope of the present invention. The protection scope of the present invention is subject to the appended claims.

What is claimed is:

1. A method for controlling pollutants in reusable agricultural water, characterized in that, the method includes: providing a constructed wetland, feeding the reusable agricultural water into the constructed wetland, then removing and degrading the pollutants by the constructed wetland, thereafter transporting treated reusable agricultural water into the agricultural activity areas;
   wherein, the constructed wetland is provided with four layers of fillers from top to bottom:
   the first layer of filler is a mixed filler of soil and functional biochar, which adsorbs heavy metals and degrades organic matters;
   the second layer of filler is a mixed filler of soil, natural zeolite and limestone, which adsorbs and fixes heavy metals;
   the third layer of filler is a mixed filler of fly ash molecular sieve, Flory diatomaceous earth and biochar, which adsorbs heavy metals, and phosphorus-accumulating bacteria is added in this area to reduce the total phosphorus content of the reusable agricultural water to be purified;
   the fourth layer of filler is a mixed filler of pebbles and biochar, which adsorbs heavy metals, and the phosphorus-accumulating bacteria is allowed to perform anaerobic living activities in this area by constructing an anaerobic environment.

2. The method according to claim 1, characterized in that, a composition of each layer of the fillers is one or more selected from the group consisting of soil, biochar, functionalized biochar, gravel, natural zeolite, volcanic stone, calcite, limestone, pebbles, diatomaceous earth and Flory diatomaceous earth.

3. The method according to claim 1, characterized in that,
   the mixing weight ratio of soil and functional biochar in the first layer of filler is 3:(6~8), and the particle size of the filler is 0.10-0.30 cm;
   the mixing weight ratio of soil, natural zeolite and limestone in the second layer of filler is 1:(2~3):(0.5~1), and the particle size of the filler is 0.08-0.1 cm;
   the mixing weight ratio of fly ash molecular sieve, Flory diatomaceous earth and biochar in the third layer of filler is 1:(3~4):(1~1.5), and the particle size of the filler is 0.05-0.08 cm;
   the mixing weight ratio of pebbles and biochar in the fourth layer of filler is 1:(1~2), and preferably the particle size of the filler is 0.30-0.50 cm.

4. The method according to claim 1, characterized in that, a polar polymer is filled between the third layer of filler and the fourth layer of filler, so that anoxic or anaerobic environment is formed in the area where the fourth layer of filler is located.

5. The method according to claim 1, characterized in that, aquatic plant reeds and aquatic plant campanula are planted on the constructed wetland, rhamnolipid or (poly)aspartic acid or a combination thereof is added during the growth process of aquatic plants.

6. The method according to claim 1, characterized in that,
   the method further includes providing an acidification tank and an aeration tank to provide microorganisms with nutrients; wherein, the acidification tank, the aeration tank and the constructed wetland are connected in sequence, wherein,
   duckweed and algae salvaged from a basin are acidified and digested in the acidification tank, and then the supernatant is transported into the aeration tank, and the COD of the supernatant transported to the aeration tank is higher than 200 mg/L;
   the supernatant from the acidification tank is received by the aeration tank, and organic matters in the supernatant are degraded by feeding an oxygen-containing fluid, thereafter the degraded supernatant is fed into the constructed wetland; the average molecular weight of organic matters in water from the aeration tank is lower than 308.24 Da.

7. The method according to claim 6, characterized in that,
   an aeration disk is set at the lower part of the aeration tank, and an oxygen-containing fluid is introduced through the aeration disk into the aeration tank; the oxygen-containing fluid is nano-bubble water or the aqueous solution containing tiny bubbles with a size of 100~500 nm and dissolved oxygen amount of 10~25 mg/L; and/or
   microorganisms are added in the aeration tank, and said microorganism is *Acinetobacter junii*.

8. A device for controlling pollutants in reusable agricultural water, characterized in that,
   the device includes an acidification tank (1), an aeration tank (2), and a constructed wetland (3) connected in sequence in the agricultural activity area, and
   in the acidification tank (1), duckweed and algae salvaged from a basin are crushed, acidified and digested, and then the supernatant is transported into the aeration tank (2), and
   in the aeration tank (2), the supernatant from the acidification tank (1) is received, and organic matters in the supernatant are degraded, thereafter the degraded supernatant is fed into the constructed wetland (3) to provide microorganisms with carbon source, and
   the constructed wetland (3) is a purification tank with a set depth, in which water from the aeration tank (2) is mixed with the reusable agricultural water, and then is fed into one or more layers of fillers laid in the constructed wetland (3), where pollutions in the reusable agricultural water are degraded and removed.

9. The device according to claim 8, characterized in that, said acidification tank (1) is a container with an interlayer, the acidification tank (1) is equipped with an agitator (8) to crush the duckweed or algae; and/or
- an aeration disk (10) is set at the lower part of the aeration tank (2), and an oxygen-containing fluid is introduced through the aeration disk (10) into the aeration tank (2); the oxygen-containing fluid is nano-bubble water or the aqueous solution containing tiny bubbles with a size of 100~500 nm and the dissolved oxygen amount of 10~25 mg/L.

\* \* \* \* \*